US010034318B2

(12) United States Patent
Choi et al.

(10) Patent No.: US 10,034,318 B2
(45) Date of Patent: Jul. 24, 2018

(54) APPARATUS AND METHOD FOR WEBRTC IN A MOBILE DEVICE

(71) Applicant: Samsung Electronics Co., Ltd., Suwon-si, Gyeonggi-do (KR)

(72) Inventors: Minseok Choi, Issaquah, WA (US); Chin-Jung Liu, East Lansing, MI (US)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 14/691,041

(22) Filed: Apr. 20, 2015

(65) Prior Publication Data

US 2016/0309531 A1 Oct. 20, 2016

(51) Int. Cl.
*H04W 52/02* (2009.01)
*H04L 12/725* (2013.01)
(Continued)

(52) U.S. Cl.
CPC ....... *H04W 76/023* (2013.01); *H04L 45/3065* (2013.01); *H04L 51/046* (2013.01); *H04L 65/1006* (2013.01); *H04L 65/1069* (2013.01); *H04L 67/02* (2013.01); *H04W 4/12* (2013.01); *H04W 4/14* (2013.01); *H04W 52/0229* (2013.01); *H04W 76/14* (2018.02); *Y02D 70/00* (2018.01); *Y02D 70/1222* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/22* (2018.01); *Y02D 70/26* (2018.01)

(58) Field of Classification Search
CPC . H04L 65/1069; H04L 65/608; H04L 65/403; H04L 65/601; H04L 67/02; H04L 67/10; H04L 67/1091
See application file for complete search history.

(56) References Cited

U.S. PATENT DOCUMENTS 6,714,793 B1 * 3/2004 Carey ............... H04L 51/04
455/412.1
6,848,001 B1 * 1/2005 Sakamoto ........ G06F 11/2069
709/201

(Continued)

FOREIGN PATENT DOCUMENTS

WO 2004/032538 A1 4/2004

*Primary Examiner* — Rasheed Gidado
(74) *Attorney, Agent, or Firm* — Jefferson IP Law, LLP (57) ABSTRACT

An apparatus and method for initiating peer-to-peer communication via a socketless communication path is provided. The method includes transmitting, from a first mobile terminal, information for creating of a P2P communication path created by the first mobile terminal to a second mobile terminal via a socketless transmission path, augmenting the information for creating the P2P communication path received from the first mobile terminal with information of the second mobile terminal, transmitting, from the first mobile terminal, the augmented information for creating the P2P communication path to the first mobile terminal via the socketless transmission path, and initiating the P2P communication via the P2P communication path based upon the augmented information being received by the first mobile terminal.

15 Claims, 5 Drawing Sheets

(51) Int. Cl.
*H04L 12/54* (2013.01)
*H04W 76/02* (2009.01)
*H04W 76/14* (2018.01)
*H04L 29/06* (2006.01)
*H04W 4/14* (2009.01)
*H04L 12/58* (2006.01)
*H04L 29/08* (2006.01)
*H04W 4/12* (2009.01)

(56) References Cited

U.S. PATENT DOCUMENTS

| | | | | |
|---|---|---|---|---|
| 6,990,352 B2 * | 1/2006 | Pyhalammi | ......... | H04L 61/2015 455/458 |
| 7,769,017 B2 * | 8/2010 | Sylvain | ................ | H04L 67/24 370/352 |
| 8,494,007 B2 * | 7/2013 | Li | ................ | H04W 8/005 370/350 |
| 9,049,262 B2 * | 6/2015 | Massover | ............ | H04L 12/1818 |
| 9,282,040 B2 * | 3/2016 | Reddy | ................ | H04L 47/10 |
| 9,345,016 B2 * | 5/2016 | Kim | ................ | H04L 5/0037 |
| 9,515,800 B2 * | 12/2016 | Lim | ................ | H04L 1/1854 |
| 2006/0160544 A1 * | 7/2006 | Sun | ................ | H04W 76/023 455/456.1 |
| 2008/0002698 A1 * | 1/2008 | Pantalone | ........ | H04L 29/06027 370/392 |
| 2014/0149512 A1 * | 5/2014 | Leitch | ............ | H04L 67/1061 709/204 |
| 2014/0349579 A1 * | 11/2014 | Zhou | ................ | H04W 12/06 455/41.2 |
| 2015/0081769 A1 * | 3/2015 | Mandyam | ........ | H04W 4/005 709/203 |
| 2015/0111587 A1 * | 4/2015 | Kalhan | ............ | H04W 72/04 455/450 |
| 2015/0180825 A1 * | 6/2015 | Ren | ................ | H04L 61/2564 709/228 |
| 2016/0021148 A1 * | 1/2016 | Ijaz | ................ | H04L 65/1069 709/206 |
| 2016/0037569 A1 * | 2/2016 | Kim | ................ | H04W 4/008 455/450 |
| 2016/0050701 A1 * | 2/2016 | Pyattaev | ........ | H04W 72/0406 370/329 |
| 2016/0100217 A1 * | 4/2016 | Hiltch | ............ | H04N 21/4431 725/109 |

* cited by examiner

APPARATUS AND METHOD FOR WEBRTC IN A MOBILE DEVICE

TECHNICAL FIELD

The present disclosure relates to an apparatus and method for initiating a peer-to-peer connection via a socketless transmission path. More particularly, the present disclosure relates to an apparatus and method for initiating a Web Real-Time Communication (WebRTC) connection via SMS or MMS.

BACKGROUND

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, video conferencing, games, remote control of short range communication, an image capturing function using a mounted digital camera, a multimedia function for providing audio and video content, a scheduling function, and many more. With the plurality of features now provided, a mobile terminal has effectively become a necessity of daily life.

One such additional feature is the video conference or chat. On a variety of mobile and stationary devices Web Real-Time Communication (WebRTC) is used to provide browser-to-browser applications for voice calls, video chat, and peer-to-peer (P2P) file sharing without the need of either internal or external plugins.

Figure 1:
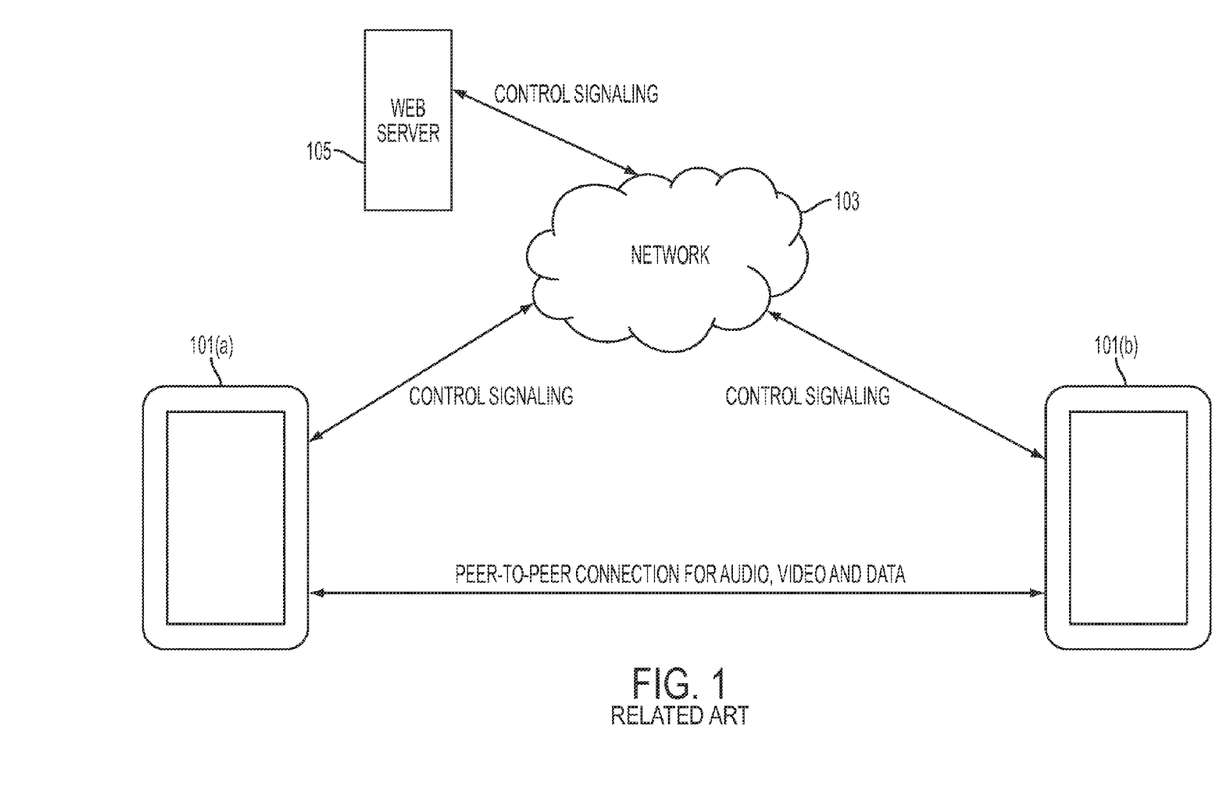
FIG. 1 illustrates a network environment for processing WebRTC based application according to the related art.

FIG. 1 illustrates a network environment for processing WebRTC based application according to the related art.

Referring to FIG. 1, a network environment including a first mobile terminal 101(a), a second mobile terminal 101(b), and a web server 105 communicating via a network 103 is illustrated.

When a user of the first mobile terminal 101(a) wishes to initiate a video chat via a browser application installed thereon with a second user of the second mobile device 101(b), the user of the first mobile terminal 101(a) must provide the video chat application of the browser a handle representing the second user of the second mobile terminal 101(b). For example, the handle may be the second user's email address, janedoe@abcdefgh123.com. The handle must be translated into an IP address via the web server 105. It will be understood that web server 105 does not necessarily know the IP address of the second mobile terminal 101(b), but the second mobile terminal 101(b) may provide the IP address during communication with the web server 105. Once the IP address of each of the first and second mobile terminals 101(a) and (b) is known to the other mobile terminal, P2P communications may commence.

The first mobile terminal 101(a) having captured the second user's handle, the first mobile terminal 101(a) transmits the handle of the second user to the web server 105 using a socket based signaling protocol. The first mobile terminal 101(a) may also transmit the first user's handle and the IP address of the first mobile terminal 101(a). WebRTC does not mandate a particular signaling protocol. However, Session Initiation Protocol (SIP), Extensible Messaging and Presence Protocol (XMPP) and the like have been used. It will be understood that such signaling protocols are a separate and additional protocol from that of the P2P messaging of WebRTC.

The web server 105 receives the message from the first mobile terminal 101(a) via the control signal and translates the handle, transmits a requests to the second mobile terminal 101(b) and upon receiving acceptance for, for example, video chat the web server 105 provides the necessary information (i.e., corresponding IP address) to each of the first and second mobile terminals 101(a) and (b) upon which P2P communication via WebRTC may commence.

However, there are drawbacks to socket based control signaling used in creating and maintaining P2P communications of WebRTC. Particularly, socket based communications are known in the art to cause batteries of mobile devices to quickly drain. Further, movement between different network or access-points requires the mobile terminals negotiate via socket based control signaling with the web server 105 each time a change as made. As stated before, such socket based transmission of control signaling consumes battery power of the mobile terminal. Additionally, the receiving mobile terminal 101(b) must listen to a port for potential sockets requests thereby further draining battery power.

Accordingly, there is a need for an apparatus and method for providing improved signaling while reducing power consumption in a mobile terminal.

SUMMARY

Aspects of the present disclosure are to address at least the above-mentioned problems and/or disadvantages and to provide at least the advantages described below. Accordingly, an aspect of the present disclosure is to provide an apparatus and method for initiating peer-to-peer communication via a socketless communication path.

In accordance with an aspect of the present disclosure, a method for initiating peer-to-peer (P2P) communication is provided. The method includes transmitting, from a first mobile terminal, information for creating a P2P communication path created by the first mobile terminal to a second mobile terminal via a socketless transmission path, augmenting the information for creating the P2P communication path received from the first mobile terminal with information of the second mobile terminal, transmitting, from the first mobile terminal, the augmented information for creating the P2P communication path to the first mobile terminal via the socketless transmission path, and initiating the P2P communication via the P2P communication path based upon the augmented information being received by the first mobile terminal.

In accordance with another aspect of the present disclosure, a mobile terminal for initiating peer-to-peer (P2P) communication is provided. The apparatus mobile terminal includes a transceiver for transmitting and receiving data over a plurality of transmission paths, and controller configured to transmit information for creating a P2P communication path to another mobile terminal via a socketless transmission path, to receive augmented information for creating the P2P communication path from the other mobile terminal via the socketless transmission path, the augmented information for creating the P2P communication path including information of the other mobile terminal, to initiate the P2P communication via the P2P communication path based upon the augmented information being received.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus and method for initiating peer-to-peer communication via a socketless communication path.

Figure 2:
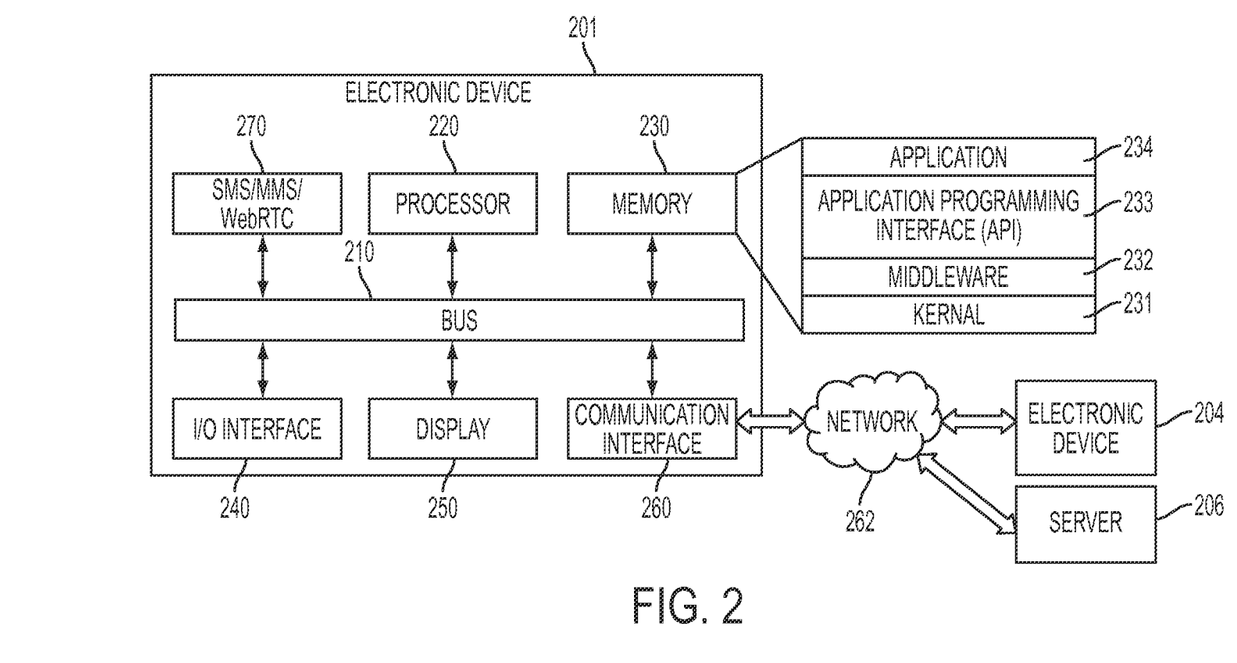
FIG. 2 illustrates a network environment including an electronic device according to various embodiments of the present disclosure.

FIG. 2 illustrates a network environment including an electronic device according to various embodiments of the present disclosure.

Referring to FIG. 2, a network environment 200 includes an electronic device 201. The electronic device 201 may include a bus 210, a processor 220, a memory 230, an Input/Output (I/O) interface 240, a display 250, a communication interface 260, a SMS/MME/WebRTC Native API module 270, and/or the like.

The bus 210 may be circuitry that connect the foregoing components and allow communication between the foregoing components. For example, the bus 210 may connect components of the electronic device 201 so as to allow control messages and/or other information to be communicated between the connected components.

The processor 220 may, for example, receive instructions from other components (e.g., the memory 230, the I/O interface 240, the display 250, the communication interface 260, the SMS/MMS/WebRTC Native API module 270, and/or the like), interpret the received instructions, and execute computation or data processing according to the interpreted instructions.

The memory 230 may, for example, store instructions and/or data that are received from, and/or generated by, other components (e.g., the memory 230, the I/O interface 240, the display 250, the communication interface 260, the SMS/MMS/WebRTC Native API module 270, and/or the like). For example, the memory 230 may include programming modules such as a kernel 231, a middleware 232, an Application Programming Interface (API) 233, an application 234, and/or the like. Each of the foregoing programming modules may include a combination of at least two of software, firmware, or hardware.

The kernel 231 may control or manage system resources (e.g., the bus 210, the processor 220, the memory 230, and/or the like) that may be used in executing operations or functions implemented in other programming modules such as, for example, the middleware 232, the API 233, the application 234, and/or the like. The kernel 231 may provide an interface for allowing or otherwise facilitating the middleware 232, the API 233, the application 234, and/or the like, to access individual components of electronic device 201.

The middleware 232 may be a medium through which the kernel 231 may communicate with the API 233, the application 234, and/or the like to send and receive data. The middleware 232 may control (e.g., scheduling, load balancing, and/or the like) work requests by one or more applications 234. For example, the middleware 232 may control work requests by one or more applications 234 by assigning priorities for using system resources (e.g., the bus 210, the processor 220, the memory 230, and/or the like) of electronic device 201 to the one or more applications 234.

The API 233 may be an interface that may control functions that the application 234 may provide at the kernel 231, the middleware 232, and/or the like. For example, the API 233 may include at least an interface or a function (e.g., command) for file control, window control, video processing, character control, and/or the like.

According to various embodiments of the present disclosure, the application 234 may include a Short Message Service (SMS) application, a Multimedia Messaging Service (MMS) application, an email application, a calendar application, an alarm application, a health care application (e.g., an exercise amount application, a blood sugar level measuring application, and/or the like), an environmental information application (e.g., an application that may provide atmospheric pressure, humidity, temperature information, and/or the like), an instant messaging application, a call application, an internet browsing application, a gaming application, a media playback application, an image/video capture application, a file management application, and/or the like. In addition to or as an alternative to, the application 234 may be an application that is associated with information exchange between the electronic device 201 and an external electronic device (e.g., electronic device 204). As an example, the application 234 that is associated with the information exchange may include a notification relay application that may provide the external electronic device with a certain type of information, a device management application that may manage the external electronic device, and/or the like.

As an example, the notification relay application may include a functionality that provides notification generated by other applications at electronic device 201 (e.g., the SMS/MMS application, the email application, the health care application, the environmental information application, the instant messaging application, the call application, the internet browsing application, the gaming application, the media playback application, the image/video capture application, the file management application, and/or the like) to an external electronic device (e.g., the electronic device 204). In addition to or as an alternative to, the notification relay application may provide, for example, receive notification from an external electronic device (e.g., the electronic device 204), and may provide the notification to a user.

As an example, the device management application may manage enabling or disabling of functions associated with least a portion of an external electronic device (e.g., the external electronic device itself, or one or more components of the external electronic device) in communication with electronic device 201, controlling of brightness (or resolution) of a display of the external electronic device, an application operated at, or a service (e.g., a voice call service, a messaging service, and/or the like) provided by, the external electronic device, and/or the like.

According to various embodiments of the presnet disclosure, as an example, the application 234 may include one or more applications that are determined according to a property (e.g., type of electronic device, and/or the like) of the external electronic device (e.g., the electronic device 204). For example, if the external electronic device is an mp3 player, the application 234 may include one or more applications related to music playback. As another example, if the external electronic device is a mobile medical device, the application 234 may be a health care-related application. According to various embodiments of the present disclosure, the application 234 may include at least one of an application that is preloaded at the electronic device 201, an application that is received from an external electronic device (e.g., the electronic device 204, a server 206, and/or the like), and/or the like.

The I/O interface 240 may, for example, receive instruction and/or data from a user. The I/O interface 240 may send the instruction and/or the data, via the bus 210, to the processor 220, the memory 230, the communication interface 260, the SMS/MMS/WebRTC Native API module 270, and/or the like. For example, the I/O interface 240 may provide data associated with user input received via a touch screen to the processor 220. The I/O interface 240 may, for example, output instructions and/or data received via the bus 210 from the processor 220, the memory 230, the communication interface 260, the SMS/MMS/WebRTC Native API module 270, and/or the like, via an I/O device (e.g., a speaker, a display, and/or the like). For example, the I/O interface 240 may output voice data (e.g., processed using the processor 220) via a speaker.

The display 250 may display various types of information (e.g., multimedia, text data, and/or the like) to the user. As an example, the display 250 may display a Graphical User Interface (GUI) with which a user may interact with the electronic device 201.

The communication interface 260 may provide communication between electronic device 201 and one or more external electronic devices (e.g., the electronic device 204, the server 206, and/or the like). For example, the communication interface 260 may communicate with the external electronic device by establishing a connection with a network 262 using wireless or wired communication. As an example, wireless communication with which the communication interface 260 may communicate may be at least one of, Wi-Fi, Bluetooth, Near Field Communication (NFC), Global Positioning System (GPS), cellular communication (e.g., Long Term Evolution (LTE), LTE Advanced (LTE-A), Code Division Multiple Access (CDMA), Wideband-CDMA (WDCMA), Universal Mobile Telecommunications System (UMTS), Wireless Broadband (WiBro), Global System for Mobile Communications (GSM), and/or the like), Infrared Data Association (IrDA) technology, and/or the like. As an example, wired communication with which the communication interface 260 may communicate may be at least one of, for example, Universal Serial Bus (USB), High Definition Multimedia Interface (HDMI), Recommended Standard 232 (RS-232), Plain Old Telephone Service (POTS), Ethernet, and/or the like.

According to various embodiments of the present disclosure, the network 262 may be a telecommunications network. As an example, the telecommunications network may include at least one of a computer network, the Internet, the Internet of Things, a telephone network, and/or the like. According to various embodiments of the present disclosure, a protocol (e.g., a transport layer protocol, a data link layer protocol, a physical layer protocol, and/or the like) for communicating between electronic device 201 and an external electronic device may be supported by, for example, at least one of the application 234, the API 233, the middleware 232, the kernel 231, the communication interface 260, and/or the like.

Figure 3:
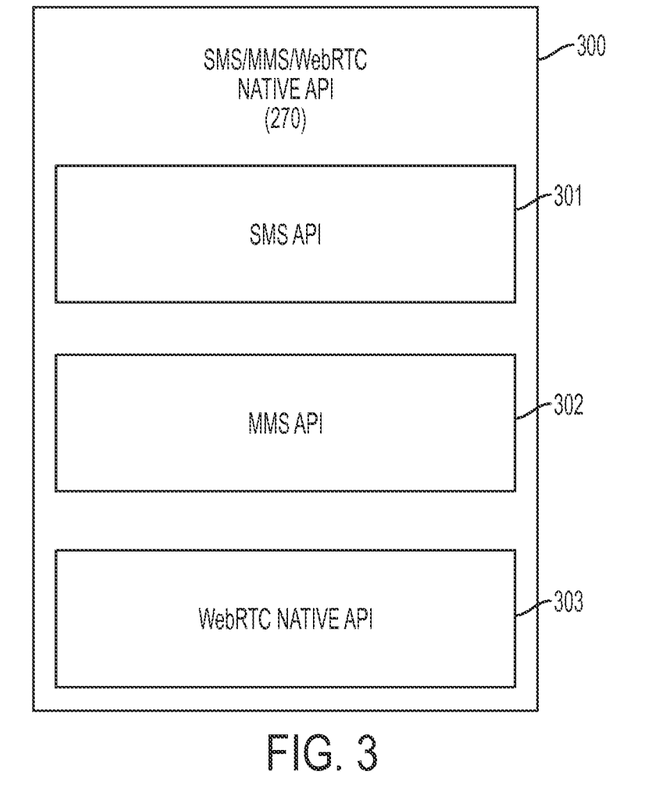
FIG. 3 illustrates a block diagram of a SMS/MMS/WebRTC Native API module according to an embodiment of the present disclosure.

The SMS/MMS/WebRTC Native API module 270 may, for example, process at least a part of information received from other components (e.g., the processor 220, the memory 230, the I/O interface 240, the communication interface 260, and/or the like), and provide various information, services, and/or the like to the user in various manners. For example, the SMS/MMS/WebRTC Native API module 270 may control via the processor 220 or independently at least some of the functions of the electronic device 201 to communicate or connect to another electronic device (e.g., the electronic device 204, the server 206, and/or the like). FIG. 3 will provide additional information regarding the SMS/MMS/WebRTC Native API module 270.

FIG. 3 illustrates a block diagram of a SMS/MMS?WebRTC Native API module according to an embodiment of the present disclosure.

Referring to FIG. 3, the SMS/MMS/WebRTC Native API module 270 may include a SMS API module 301, MMS API module 302, and WebRTC Native API module 303.

The SMS module 301 may be configured to, for example, provide an interface to allow SMS message to transmitted and received by native applications of a mobile terminal.

The WebRTC Native API module 303 may be configured to, for example, provide a method for native applications of a mobile terminal to perform P2P applications without the use of a web browser.

Figure 4:
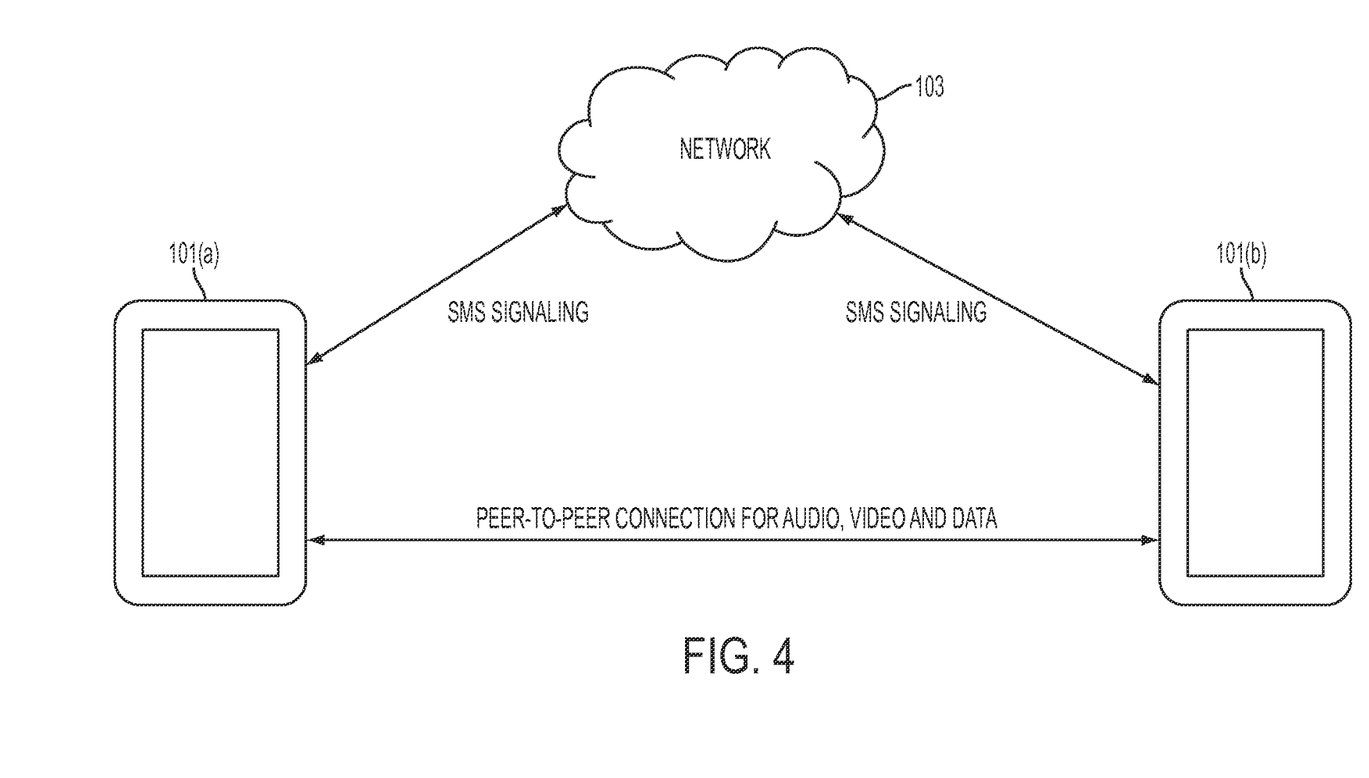
FIG. 4 illustrates a network environment for processing WebRTC based native application according to an embodiment of the present disclosure.

FIG. 4 illustrates a network environment for processing WebRTC based native application according to an embodiment of the present disclosure.

Referring to FIG. 4, a network environment including a first mobile terminal 101(a), a second mobile terminal 101(b) communicating via a network 103 is illustrated.

A user of the first mobile terminal 101(a) wishes to initiate a video chat via a native application or browser application installed thereon with a second user of the second mobile terminal 101(b). In order to initiate the video chat the user of the first mobile terminal 101(a) must provide the video chat application or other application Service Centre Address (SCA) (i.e., cellular phone number) representing the second user's mobile terminal (i.e., the second mobile terminal 101(b)). The SCA will be used to populate a SMS packet along with a Session Description Protocol (SDP) data used for describing streaming media initialization parameters used by WebRTC. It will be understood that more than one SMS packets may be required to transmit the entirety of the SDP data. The SDP data may include, for example, the IP address of the first mobile terminal 101(a) among other identifying information of the first mobile terminal 101(a).

The SDP data is transmitted to the second mobile terminal 101(b) using SMS as the signaling protocol. Thus, it will be understood that the SDP data to provide information necessary to initiate the WebRTC P2P connection is transmitted without the requirement of a socket for signaling or a web-server (see web server 105 of FIG. 1) to translate information regarding each of the first and second mobile terminals 101(a) and (b).

The SDP data of the first mobile terminal 101(a) upon receipt by the second mobile terminals 101(b) is forwarded to the video chat application or other application of the second mobile terminal 101(b). The video chat application of the second mobile terminals 101(b) may transmit back SDP data, including, for example the IP address of the second mobile terminal 101(b) via SMS signaling.

In this manner the first and second mobile terminals 101(a) and (b) handshake and provide each other the information necessary for streaming data back via WebRTC Native API. It will be understood that more than one transmission back and forth between the first and second mobile terminals 101(a) and (b) by means of SMS signaling may be required.

Once the IP address of each of the first and second mobile terminals 101(a) and 101(b) is known to the other mobile terminal, P2P communications may commence.

Figure 5:
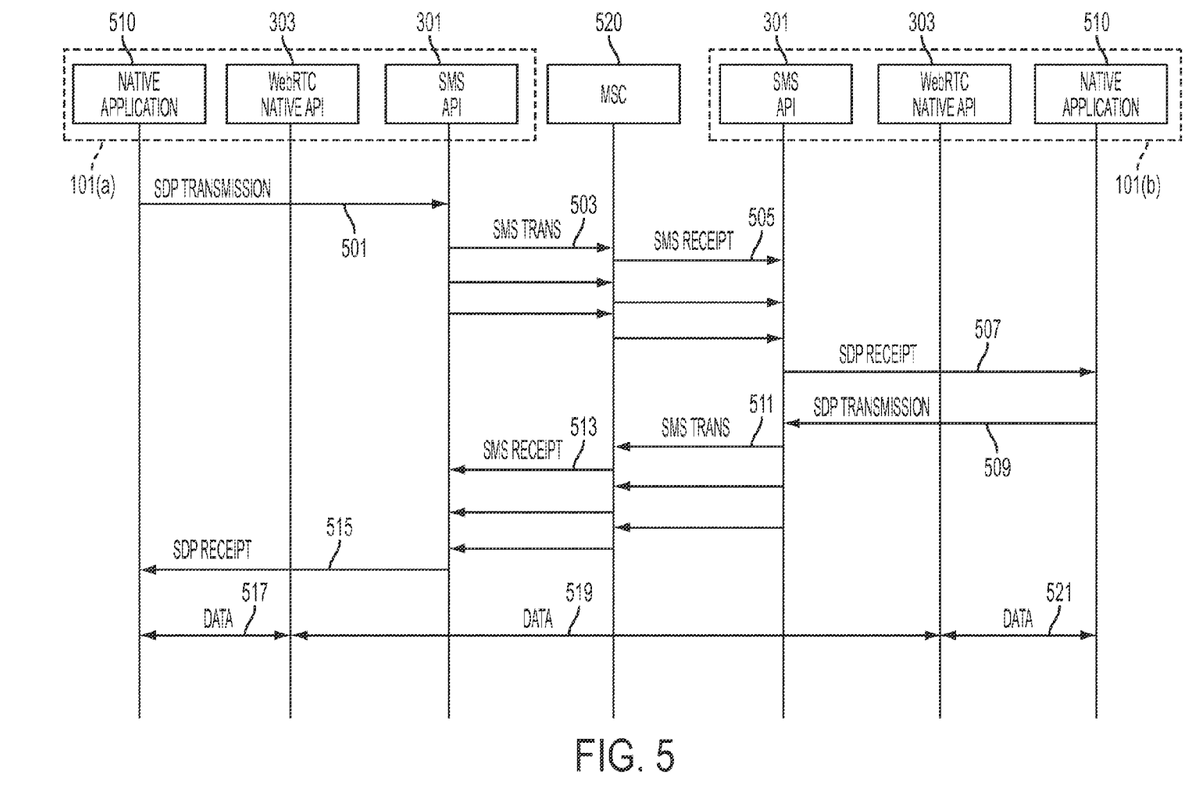
FIG. 5 illustrates a network diagram for initiating a P2P video chat between two mobile terminals according to an embodiment of the present disclosure.

FIG. 5 illustrates a network diagram for initiating a P2P video chat between two mobile terminals according to an embodiment of the present disclosure.

Referring to FIG. 5, a network includes first and second mobile terminals 101(a) and 101(b) and a Mobile Switching Center (MSC) 520. Each of the mobile terminals 101(a) and 101(b) includes a native application 510, such as a video chat application, an SMS API 301 and a WebRTC Native API 303.

A user of the first mobile terminal 101(a) via the native application 510 wishes to initiate a video chat with the user of the second mobile terminal 101(b). Via a user interface of the native application 510, the user enters an SCA (i.e., phone number of the second mobile terminal 101(b)) to indicate with whom the user wishes to speak. The native application 510 of the first mobile terminal 101(a) creates information according to SDP (i.e., SDP data) necessary to support WebRTC P2P communication between the mobile terminals 101(a) and 101(b) and passes the information to the SMS API 301 in operation 501. The SMS API 301 gauges the size of the SDP data and determines that three SMS packets are required to encapsulate the SDP data and transmits the three packets in operation 503 to the MSC 520. In turn, the MSC 520 transmits the three packs to the second mobile terminal 101(b)'s SMS API 301 in operations 505. The SMS API 301 of the second mobile terminal 101(b) in turn passes the SDP data to the native application 510 of the second mobile terminal 101(b) in operation 507.

The native application 510 augments the SDP data with information of the second mobile terminal 101(b) and passed the augment information back to the SMS API 301 in operation 509. The SMS API 301 of the second mobile terminal 101(b) gauges the size of the SDP data and determines that three SMS packets are required to encapsulate the SDP data and transmits the three packets in operation 511 to the MSC 520. In turn the MSC 520 transmits the three packs to the first mobile terminal 101(a)'s SMS API 301 in operation 513. The SMS API 301 of the first mobile terminal 101(a) in turn passes the augmented SDP data to the native application 510 of the first mobile terminal 101(a) in operation 515.

Once the handshaking via SMS signaling (i.e., operations 501-515) is completed P2P communications via operations 517, 519 and 521 may commence. It will be understood that the P2P communication of operations 517, 519 and 521 occurs on a communications path/channel that is separate from the SMS communications path. It will be understood that the communications path for operations 517, 519 and 521 occurs on the normal path for such P2P communications as implemented in WebRTC.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method for initiating peer-to-peer (P2P) communication, the method comprising:

transmitting, from a first mobile terminal, information for creating a P2P communication path created by the first mobile terminal to a second mobile terminal via a socketless transmission path;

augmenting, by the second mobile terminal, the information received from the first mobile terminal for creating the P2P communication path with information of the second mobile terminal, the augmented information comprising information of the first mobile terminal received from the first mobile terminal and the information of the second mobile terminal, for the creating of the P2P communication path;

transmitting, from the second mobile terminal, the augmented information for creating the P2P communication path to the first mobile terminal via the socketless transmission path; and initiating the P2P communication via the P2P communication path based upon the augmented information being received by the first mobile terminal.

2. The method of claim 1, wherein the socketless transmission path is a path is a separate path from the P2P communication path.

3. The method of claim 1, wherein the socketless transmission path is one of a short messaging service (SMS) transmission path or a multimedia message service (MMS).

4. The method of claim 3, wherein the P2P communication is performed by a native application of the first mobile terminal and the second mobile terminal using a web real-time communication (WebRTC) Native application programming interface (API).

5. The method of claim 4, wherein the information for creating the P2P communication path is based upon session description protocol (SDP).

6. The method of claim 5, wherein the information for creating the P2P communication path based upon the SDP encapsulating the information in at least one SMS packet.

7. The method of claim 3, wherein the second mobile terminal is identified by a service center address (SCA) inserted in a SMS packet header.

8. The mobile terminal of claim 3, wherein the other mobile terminal is identified by a service center address (SCA) inserted in a SMS packet header.

9. A mobile terminal for initiating peer-to-peer (P2P) communication, the mobile terminal comprising:

a transceiver for transmitting and receiving data over a plurality of transmission paths; and at least one processor configured to:

transmit information for creating a P2P communication path created to another mobile terminal via a socketless transmission path, receive, from the other mobile terminal, the information transmitted to the other mobile terminal augment by the other mobile terminal, for creating the P2P communication path from the other mobile terminal via the socketless transmission path, the augmented information for creating the P2P communication path including information of the other mobile terminal, the augmented information comprising information of the mobile terminal transmitted to the other mobile terminal and the information of the other mobile terminal, for the creating of the P2P communication path, and initiate the P2P communication via the P2P communication path based upon the augmented information being received.

10. The mobile terminal of claim 9, wherein the socketless transmission path is a path is a separate path from the P2P communication path.

11. The mobile terminal of claim 9, wherein the socketless transmission path is one of a short messaging service (SMS) transmission path or a multimedia message service (MMS).

12. The mobile terminal of claim 11, wherein the P2P communication is performed by a native application of the mobile terminal and the other mobile terminal using a web real-time communication (WebRTC) Native application programming interface (API).

13. The mobile terminal of claim 12, wherein the information for creating the P2P communication path is based upon session description protocol (SDP).

14. The mobile terminal of claim 13, wherein the information for creating the P2P communication path based upon the SDP encapsulating the information in at least one SMS packet.

15. A non-transitory computer readable recording medium with a program stored thereon, the program executed by at least one processor to perform the method of claim 1.

* * * * *